Jan. 24, 1961 M. H. DUBOIS 2,969,439
ELECTRIC SWITCHING DEVICE
Filed Oct. 18, 1957 2 Sheets-Sheet 1

INVENTOR
MARTIN H. DUBOIS

BY Strauch, Nolan & Neale
ATTORNEYS

Jan. 24, 1961 M. H. DUBOIS 2,969,439

ELECTRIC SWITCHING DEVICE

Filed Oct. 18, 1957 2 Sheets-Sheet 2

INVENTOR
MARTIN H. DUBOIS

BY Strauch, Nolan + Neale
ATTORNEYS

United States Patent Office 2,969,439

Patented Jan. 24, 1961

2,969,439

ELECTRIC SWITCHING DEVICE

Martin H. Dubois, Hagersten, Sweden, assignor to Svenska Relafabriken ABN AB, Tyreso, Sweden, a Swedish company Filed Oct. 18, 1957, Ser. No. 691,014

Claims priority, application Sweden Oct. 22, 1956

2 Claims. (Cl. 200—18)

The present invention relates to an electric switching device comprising a number of contact spring sets and a number of operating members by means of which the contact spring sets may be actuated.

It is an object of the invention to provide an improved keyset for digit transmission from a subscriber's telephone apparatus connected to an automatic telephone system. Keysets of this kind are previously known and comprise a number (usually ten) of push buttons which are of the non-locking type, and a number of contact means arranged to be actuated separately or in different combinations by means of the push buttons. Each push button represents a certain digit, and when a subscriber whose apparatus is provided with a keyset, wants to be connected to another subscriber, he operates in turn those push buttons which represent the digits of the called subscriber's number. The contact means which are arranged to be operated by the different push buttons, then cause the transmission of code signals representing the digits over an outgoing line to an automatic telephone exchange which builds up a connection to the called apparatus in some known manner under the control of said signals.

It is an object of the invention to provide such a device which is particularly suited for use in subscribers' stations in intercommunication systems in which the digit code transmission takes place over two circuits having one common conductor.

Another object of the invention is to provide a novel switching device which also affords the advantages of being simple to manufacture and assemble.

The invention will be described more in particular in conjunction with the accompanying drawings which show a keyset embodying the invention for digit sending in automatic telephone systems in which the subscriber stations are connected to an exchange over 3- or 4-wire connecting circuits.

Figure 1:
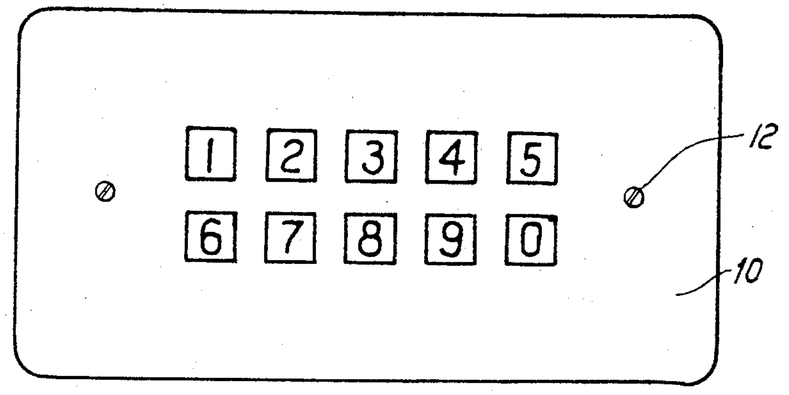
Figure 1 shows the device in front view.

On the drawings numeral 10 designates a front plate on which ten operating members consisting of push buttons are mounted. The push buttons are numbered 1, 2, . . . 9, and 0 respectively. A supporting plate 11 is attached by means of spacing members and screws 12 to the under side of the front plate 10, so that the supporting plate 11 is parallel to and at a certain distance from the front plate 10. As appears from Figures 1 and 2, the push buttons are arranged in two parallel rows with five push buttons in each row. In Figure 3, two of the push buttons are shown in longitudinal section. Each push button consists of a top portion 25 which protrudes through an opening in the front plate 10, a flange 26 and a stud 27 which protrudes through an opening in the supporting plate 11.

The supporting plate 11 carries two rows of contact spring sets 13 and 14 respectively which contain the contact springs required for the digit transmission. Each row of contact spring sets consists of four insulating strips 15 between which the contact springs are clamped as by means of rivets through the insulating strips. The rows of contact spring sets 13 and 14 are attached to the supporting plate 11 as by means of screws 16.

Figure 5:
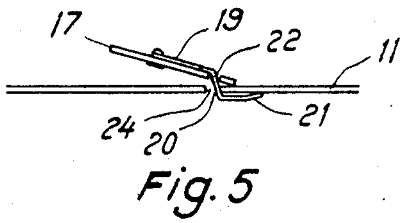
Figure 6:
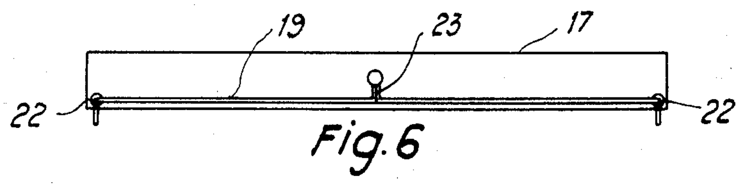

Two lifting bars 17 and 18 are positioned on the top side of supporting plate 11. Each of the lifting bars 17 and 18 is attached to the supporting plate by means of a spring 19 which is riveted to the lifting bar. The spring 19 consists of a wire, the shape of which is best seen in Figures 5 and 6. When spring 19 is mounted on the lifting bar, the bent portions 20 and 21 of the spring are put through holes 22 in the lifting bar whereupon the bent-out portion 23 of the spring is pressed towards and riveted to the lifting bar. Hence the portions 20 and 23 of spring 19 will be turned in relation to each other whereby the spring obtains a certain torsional bias which causes the portions 21 of the spring to form a certain angle to the plane of the lifting bar. The lifting bar is attached to the supporting plate by portions 20 and 21 of the spring being pushed through holes 24 in the supporting plate and the lifting bar being then turned so that the ends of portions 21 of the spring will rest against the bottom side of the supportnig plate. Each of the portions 20 of spring 19 which runs through the holes in the lifting bar and the supporting plate is of about the same length as the combined thickness of the lifting bar and the supporting plate.

Each of the lifting bars rests by one of its longitudinal edges on the top side of supporting plate 11, and this edge serves as pivot axis for the bar. Due to the torsional bias in spring 19 the lifting bar will be pressed against the flanges 26 on the operating members of one row. When a push button acting upon the lifting bar is pushed down the torsional tension in the spring 19 will be still increased whereby the lifting bar is securely held in contact with the supporting plate.

Figure 2:
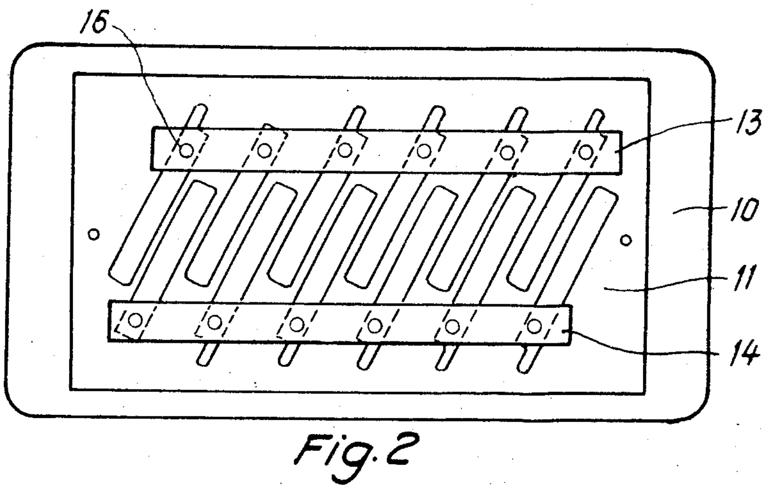
Figure 2 shows the device in rear view.
Figure 3:
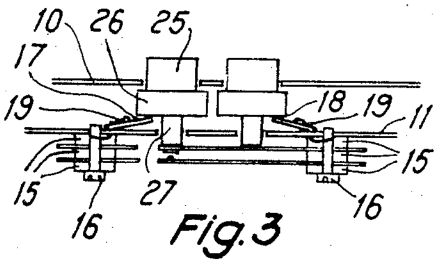
Figure 3 shows a cross section of the device.
Figure 4:
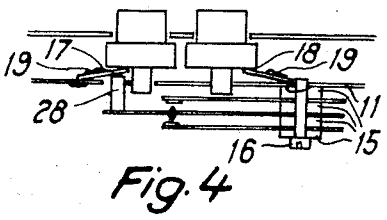
Figures 4, 5 and 6 show details of the device.

As will be seen from Figure 2, the contact spring sets and the two rows of push buttons are so arranged in relation to each other that each of the push buttons of one row is located adjacent a contact spring set belonging to the row of contact spring sets located at the opposite side. In addition to the contact spring sets which are intended for individual operation by the push buttons, each of the rows of contact spring sets 13 and 14 contains an additional contact spring set which is intended to be operated by the lifting bar which is common to the row. This additional contact spring set is shown in Figure 4 and contains a change-over contact. The middle spring is provided with a lifting pin 28 which is pressed downwards upon the operation of the lifting bar whereby the contact change-over operation is performed.

In the shown embodiment, the contact spring sets which are to be operated by push buttons 2, 3, 4, 5, 7, 8 and 9, form make contacts while the contact spring set to be operated by push button 0 forms a double make contact. The top spring of each spring set exerts a pressure on the portion 27 of the respective push button and thereby keeps the push button in its initial position when not operated. There are no individual contact spring sets provided for push buttons 1 and 6. When one of these push buttons is depressed, only the lifting bar 17 or 18 and hence the change-over contact common to the row of push buttons is operated. However, in order to keep push buttons 1 and 6 in their initial positions when non-operated there is provided a supporting spring similar to a contact spring for each of them. Due to the provision of a lifting bar common to a row of push buttons for operating the change-over contact common to the row, it has been possible to reduce considerably the total number of contact springs as compared with keysets hitherto known.

Figure 7:
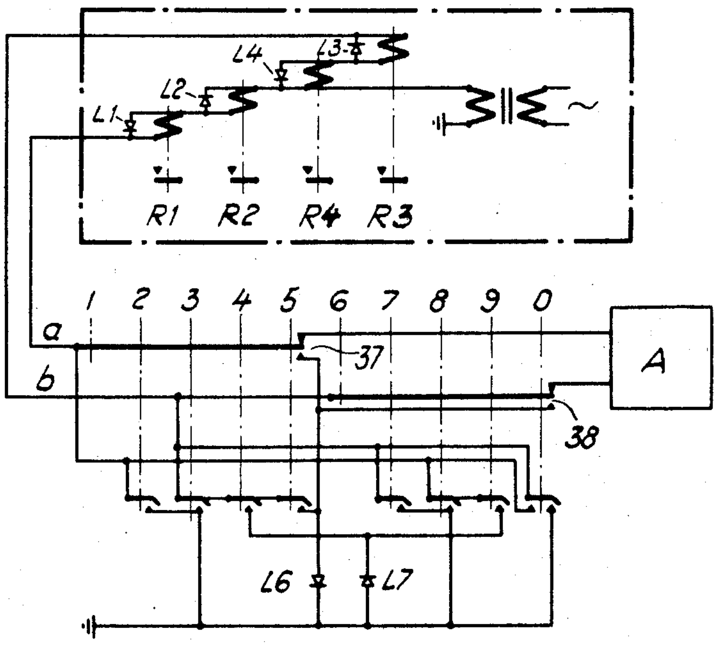
Figure 7 shows a circuit diagram for connecting the device according to the invention.

Figure 7 illustrates the connection of the keyset to a subscriber's telephone apparaus A and to a digit receiving device, such as a register in a telephone exchange. Such a receiving device typically comprises four relays R1, R2, R3, and R4, the coils of which are connected in parallel with rectifiers L1, L2, L3 and L4 respectively. The orientation of these rectifiers is apparent from the figure. The coils of the relays and the rectifiers are connected in the manner illustrated to conductors *a* and *b* of a line which connects the subscriber's apparatus to the register. The keyset contacts belonging to the different push buttons are designated with the numbers of the respective push buttons in the figure. The above-mentioned change-over contacts which are to be actuated by the lifting bars 17 and 18 respectively are designated 37 and 38 respectively. Two rectifiers L6 and L7 are also connected to the keyset.

If one of the push buttons is depressed, the subscriber's telephone apparatus A will be disconnected from line *a*—*b* either by the break contact of change-over contact 37 (in the case that one of buttons 1–5 is manipulated) or by the break contact in change-over contact 38 (in the case that one of buttons 6–0 is manipulated). Hereby the digit transmission is prevented from causing disturbing noise in the loudspeaker of the apparatus and from establishing non-desired circuits through the system.

When the push buttons are manipulated, different circuits for an alternating current obtained from a transformer T in the register will be closed, whereby one or more of relays R1 to R4 are operated in different combinations according to which of the buttons is manipulated. From the table below, the voltages which will appear on conductors *a* and *b* are identified when different ones of the buttons are pushed down. In the table, the symbol ∼ indicates that the whole cycle of the alternating voltage is present on the conductor in question, the symbol + indicates that only the positive and the symbol — indicates that only the negative half-waves are present on the conductor.

| | 1 | 2 | 3 | 4 | 5 | 6 | 7 | 8 | 9 | 0 |
|---|---|---|---|---|---|---|---|---|---|---|
| *a* | — | ∼ | — | — | — | | | ∼ | + | ∼ |
| *b* | | | ∼ | + | — | — | ∼ | — | — | ∼ |

Hence relays R1 to R4 will be operated in different combinations according to which button of the keyset is depressed.

What I claim is:

1. Electric switching device comprising a number of keys, a number of contact sets individually operable by said keys, at least one additional contact set, and actuating means for actuating said additional contact set, said actuating means comprising a strip having an edge resting on a supporting member, each of said keys having means coacting with said strip for imposing a rotation to the strip about said edge when the key is operated, said strip having associated therewith spring means consisting of an elastic wire having an intermediate portion extending along the strip in parallel with and at some distance from said edge and bent end portions protruding through holes in the strip and in said supporting member, said bent end portions having their ends resting against a side of said supporting member opposite to the side against which said strip is resting, and said intermediate portion of said wire having a bent-out portion attached to the strip.

2. In an electric switching device, a row of push buttons, a contact spring set including at least one movable contact spring, a strip of flat material extending in parallel with the row of push buttons and having a first edge in engagement with the push buttons, a supporting member for supporting said strip, said strip having a second edge parallel to said first edge, said second edge resting against said supporting member and forming a pivotal axis for the strip, spring means associated with said strip and with said supporting member for keeping said second edge of the strip in engagement with the supporting member and said first edge of the strip in engagement with the push buttons, and means linking said movable contact spring with said strip.

References Cited in the file of this patent

UNITED STATES PATENTS

| | | |
|---|---|---|
| 2,395,269 | Hansen | Feb. 19, 1946 |
| 2,400,148 | Hubbard | May 14, 1946 |
| 2,433,836 | Bowne | Jan. 6, 1948 |
| 2,519,899 | Gaynor | Aug. 22, 1950 |
| 2,534,715 | Horton | Dec. 19, 1950 |
| 2,760,014 | Euler | Aug. 21, 1956 |
| 2,767,252 | Weimershaus | Oct. 16, 1956 |

FOREIGN PATENTS

| | | |
|---|---|---|
| 127,292 | Sweden | Jan. 31, 1950 |